July 14, 1964

T. R. THOMAS 3,140,664

LUBRICATION

Filed Feb. 19, 1960

INVENTOR.
THOMAS R. THOMAS

BY

ATTORNEY

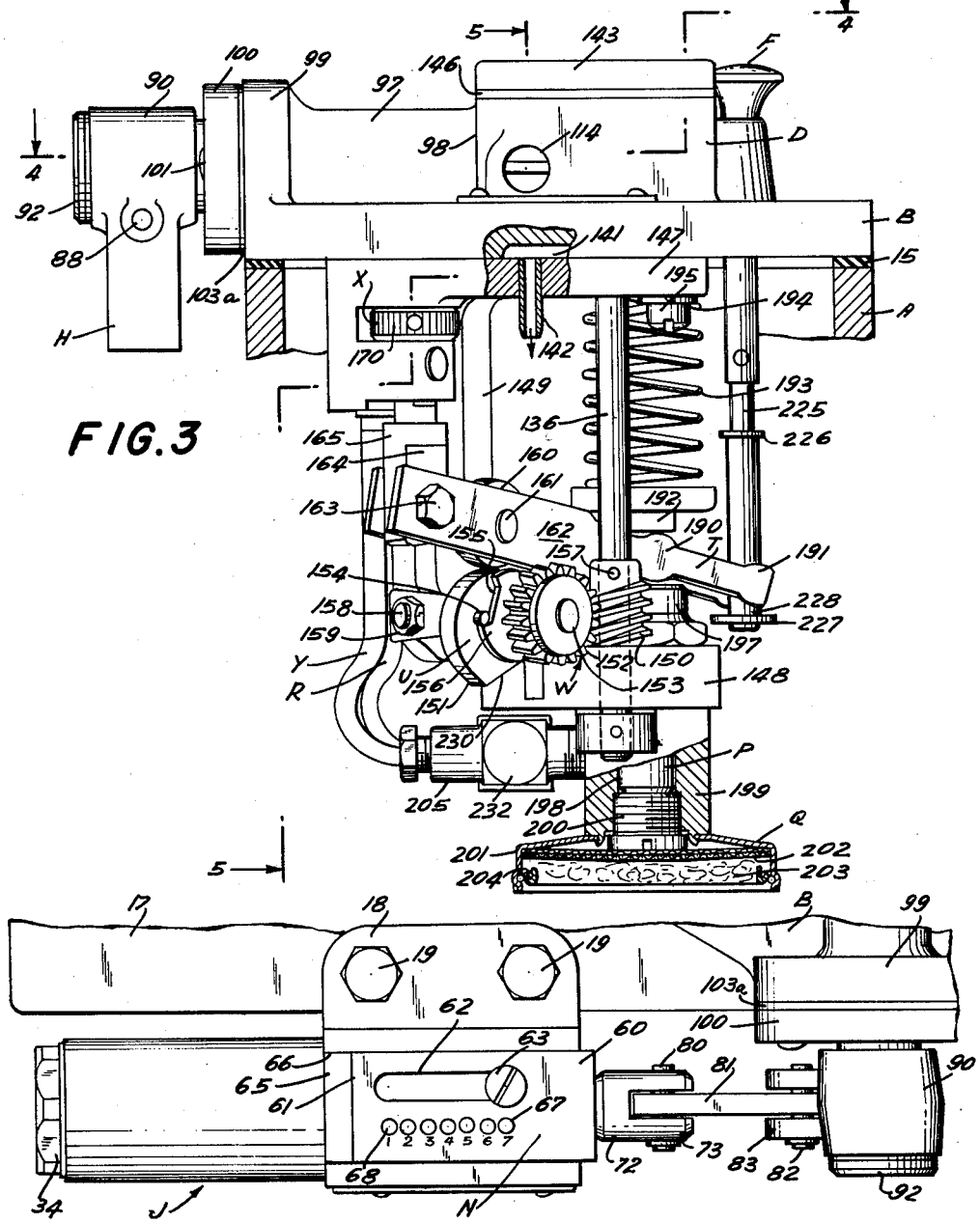

July 14, 1964  T. R. THOMAS  3,140,664
LUBRICATION
Filed Feb. 19, 1960  5 Sheets-Sheet 3

INVENTOR.
THOMAS R. THOMAS
BY
ATTORNEY

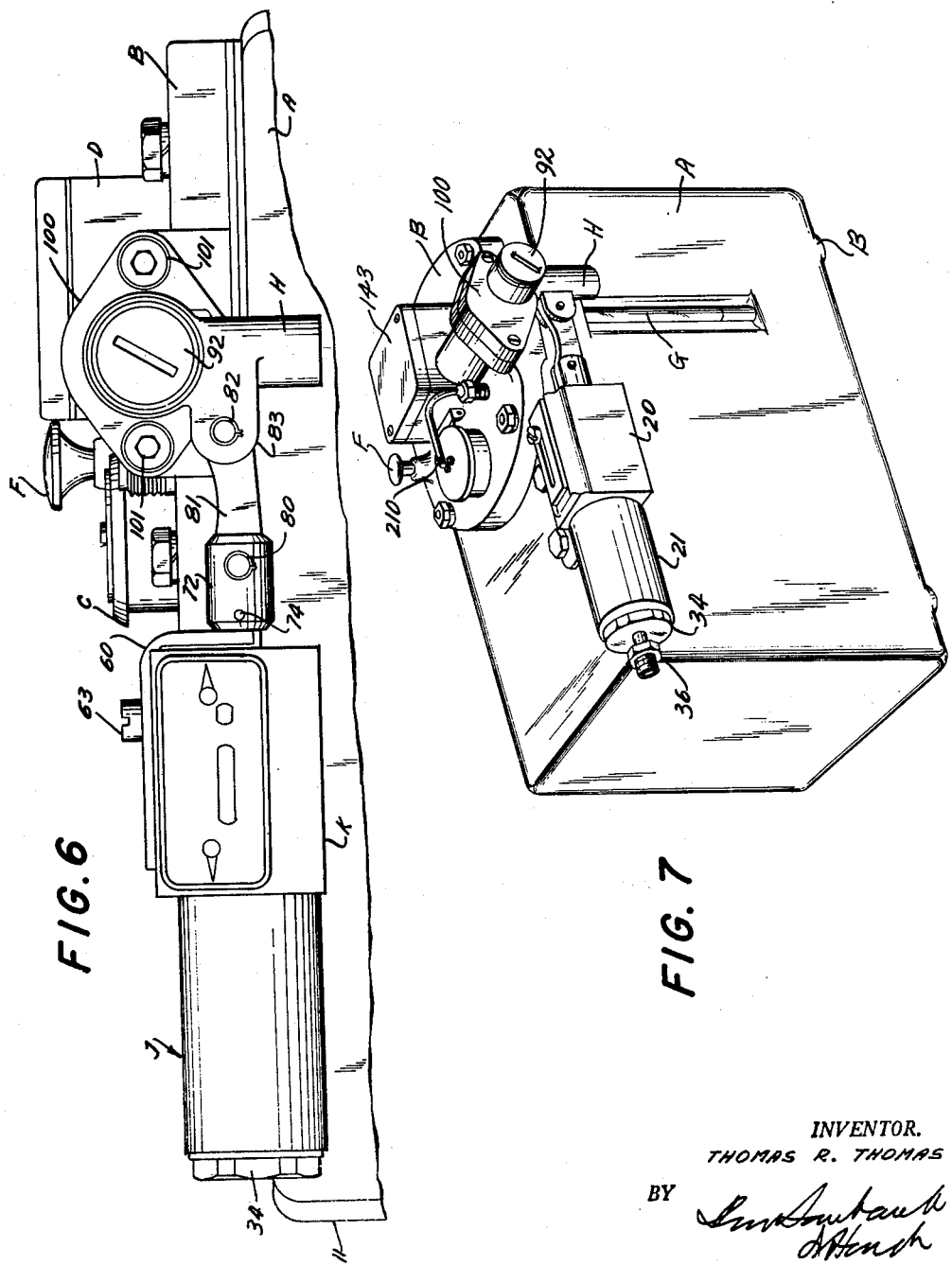

July 14, 1964 T. R. THOMAS 3,140,664
LUBRICATION

Filed Feb. 19, 1960 5 Sheets-Sheet 5

INVENTOR.
THOMAS R. THOMAS
BY
ATTORNEY

United States Patent Office 3,140,664
Patented July 14, 1964

3,140,664
LUBRICATION
Thomas R. Thomas, New York, N.Y., assignor to Auto Research Corporation, Dover, Del., a corporation of Delaware
Filed Feb. 19, 1960, Ser. No. 9,945
5 Claims. (Cl. 103—47)

The present invention relates to lubricating and it particularly relates to lubricant pressure sources which are designed to supply lubricant under pressure to a centralized lubricating system at predetermined intervals and in predetermined amounts.

It is among the objects of the present invention to provide a centralized lubricating installation in which the lubricant will be supplied both automatically and manually at predetermined intervals in shots or in quantities depending upon the needs of the machine being lubricated with assurrance that throughout operation of the machine the pre-determined supply of lubricant will be accurately fed in accordance with the cycle of operation desired.

Another object is to provide a pressure discharge source for a centralized lubricating installation which will be automatically operated from the machine being operated and in which it will be possible to vary the discharge of lubricant to the centralized lubricating branched conduit installation so that the discharge per predetermined number of machine cycles may be widely varied to give the desired lubricant control.

A still further object of the present invention is to provide a cyclic feeding arrangement for supplying lubricant to a centralized lubricating installation in which both mechanical and hydraulic drives may be employed to control the feed of lubricant or oil over a wide adjustment range in accordance with the requirements of the bearings to be lubricated.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects according to one preferred embodiment of the present invention it has been found most satisfactory to provide a cyclic lubricating pump or reciprocator which may be actuated by hydraulic pressure from the machine being served to give a predetermined discharge per number of machine cycles which may vary depending upon the setting of the mechanism from a small quantity in the order of 1 to 3 cubic centimeters per 100 strokes up to a quantity of 15 to 30 cubic centimeters per 100 strokes, with the number of strokes per lubricator cycle varying within the range of 100 hydraulic strokes down to 5 to 10 hydraulic strokes.

In the preferred operation the hydraulic pressure will drive a piston connected to a ratchet arm and be returned by a stressed spring with from 5 to 10 different settings of the piston strokes being provided, which settings determine the number of hydraulic strokes or machine cycles required for one lubricator cycle.

Desirably the apparatus is particularly used with machines where the lubricant supply should be relatively small per machine cycle and the lubricator may operate on any hydraulic line pressure varying from 150 lbs. p.s.i. up to 3,000 lbs. p.s.i.

In one preferred embodiment a small hole is drilled through the hydraulic piston to bleed a small amount of oil or lubricant on the pressure stroke thereby cushioning the shock of operation at high pressures.

The stroke of the piston may be readily varied by providing a setting pin having a plurality of setting positions which will vary the number of hydraulic strokes per lubricant cycle, as well as the discharge per 100 hydraulic strokes.

The pump itself desirably consists of a lubricating piston which is lifted against a spring by a lever actuated by a cam which releases the lever once per each revolution of the cam to discharge into the distributing system.

This operating lever may be provided with a stroke adjustment nut which will lower or elevate the pivotal position of the lever and thus control the actual stroke of the pump for the lubricant.

There may also be provided an instant feed button which will permit a shot to be given to the lubricant system manually whenever such is determined to be necessary.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 2 is a fragmentary top elevational view showing the hydraulic cylinder and actuator arrangement.

FIG. 3 is a side elevational view partly in section of the interior pump unit showing at the left the actuating lever for the mechanical pump driving arrangement.

FIG. 6 is a fragmentary side elevational view of the hydraulic actuator.

FIG. 7 is a top perspective view of the complete apparatus.

Figure 1:
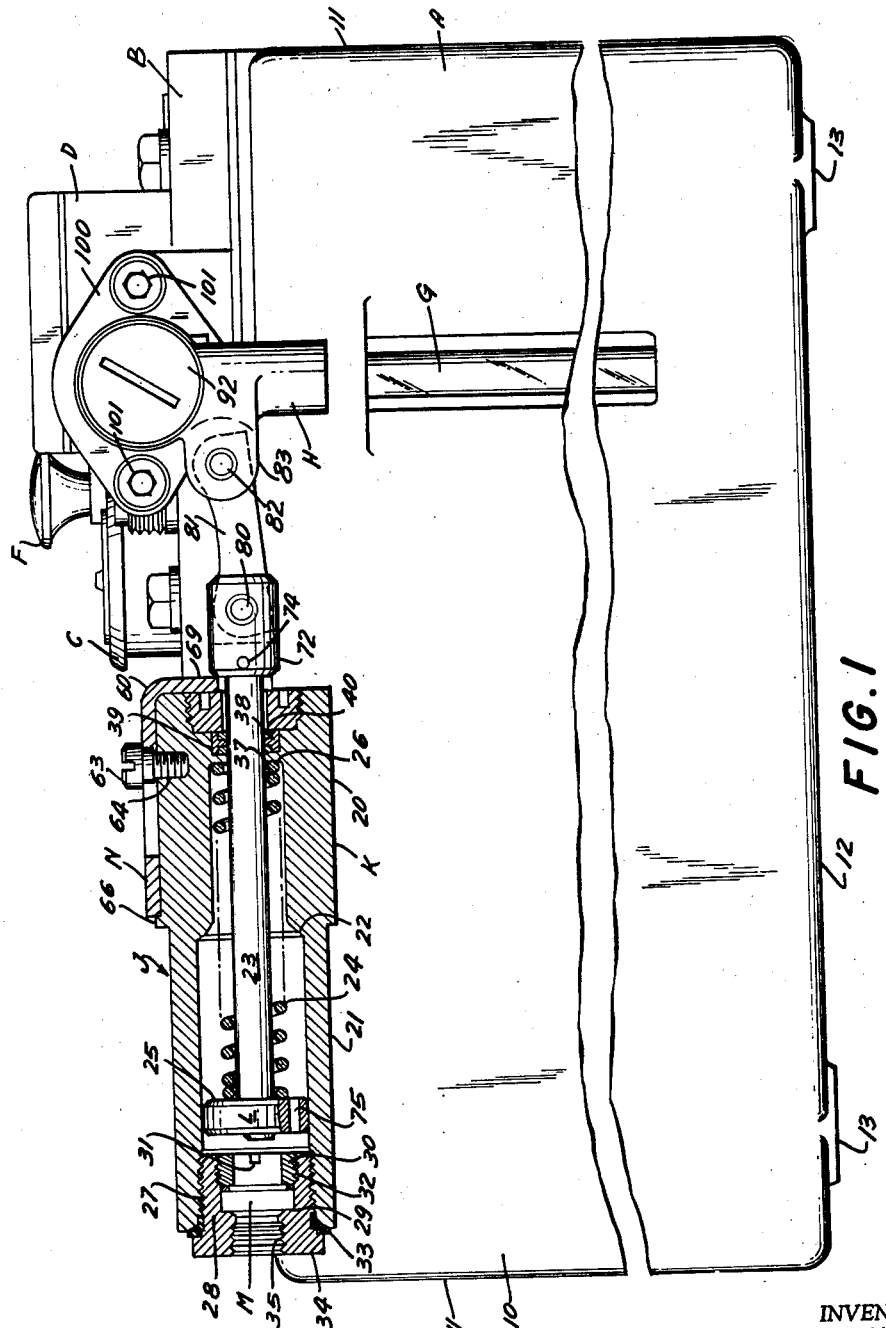
FIG. 1 is a side elevational view of the pump and reservoir unit showing the hydraulic cylinder and piston actuator in section.

Referring to FIG. 1 there is shown a reservoir A having a cover B which carries the filler cap C, the mechanism enclosure D, the main transverse drive shaft E and the instant feed button F.

The reservoir itself is provided with a sight glass G.

The shaft E is actuated by means of a lever H and the hydraulic cylinder arrangement J having a cylinder body K and a piston L with an inlet filter or strainer M.

The hydraulic piston is provided with a stroke adjustment N.

Figure 4:
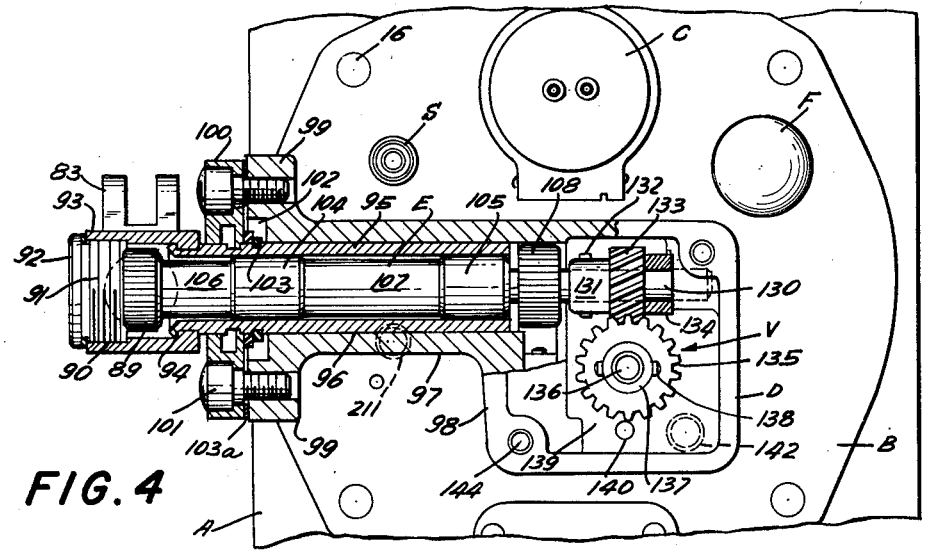
FIG. 4 is a top plan view partly in section along the line 4—4 of FIG. 3.
Figure 5:
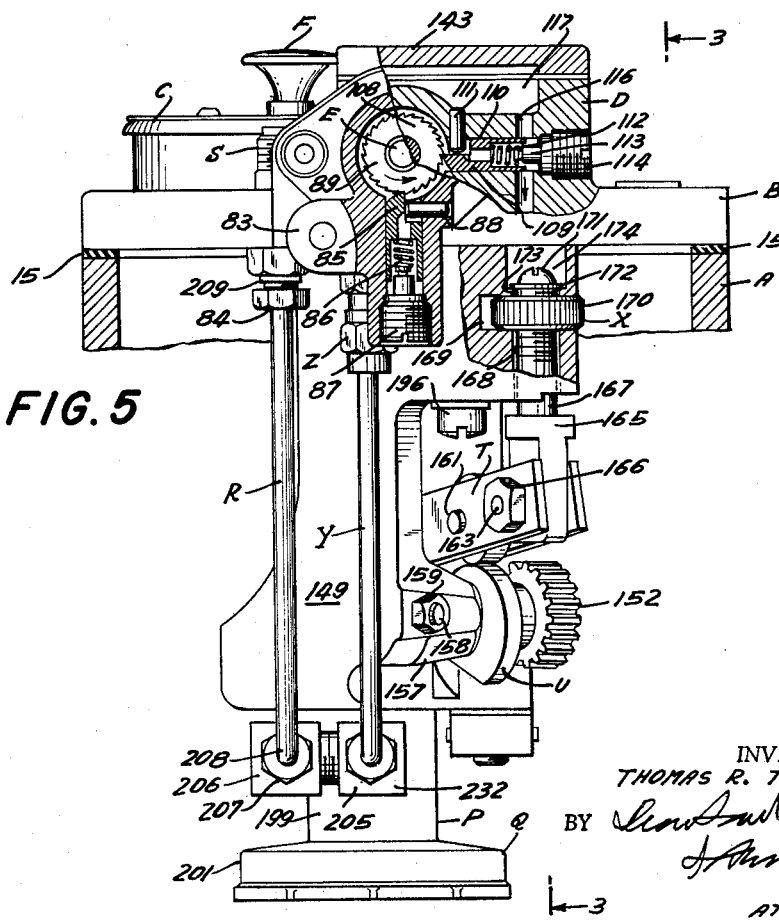
FIG. 5 is a side elevational view partly in section with the sectional portion being taken upon the line 5—5 of FIG. 3.

Referring to FIGS. 3, 4 and 5, the pump structure itself is provided with a piston cylinder combination P having an inlet strainer Q and a discharge connection R leading to the external branched distributing system through the outlet S.

The pump piston is periodically lifted by the lever T which is actuated by the cam U which is driven through a gearing arrangement on the cover indicated at V in FIG. 4 and in the lower part of the pump structure indicated at W in FIG. 3.

The pump is provided with an adjustment X to adjust the stroke of the pump by means of varying the pivot points of the lever T.

The alternative outlet Y supplies lubricant through a restriction fitting Z to the upper gearing mechanism V.

Referring to FIGS. 1 and 2 the reservoir consists of a rectangular cast metal body having the side walls 10, the end walls 11 and the bottom 12 which receives the mounting openings in the bosses 13.

The sight glass G will indicate the level of lubricant in the reservoir in which the pump unit as shown in FIGS. 3 and 5 is immersed when the cover B carrying said pump unit P is mounted on the reservoir and sealed thereto by the intermediate gasket 15.

The bolts 16 will clamp the cover B to the top of the reservoir A compressing the gasket 15.

The hydraulic cylinder unit J is held on to the top 17 of the reservoir by the extension 18 and the bolts 19 (see FIG. 2).

The bracket 18 will hold the hydraulic cylinder K which has a large end 20 and a small end 21 with an intermediate shoulder 22.

Within the cylinder is the connecting rod 23 of the piston L (see FIG. 1).

The connecting rod is encircled by the spring 24 which retracts at one end against the face 25 of the piston L and at the other end against the end shoulder 26 of the cylinder.

The inlet end of the cylinder K is tapped as indicated at 27 to receive a threaded inlet plug which has a recess 29 receiving a filter or strainer M for the hydraulic oil.

This filter unit or strainer unit M will be held in position by the threaded annular plug 30 provided with the fillister slot 31, which plug 30 is threaded into the tapped opening 32. The plug 28 is provided with a right angular seal 33 and it is compressed in position by the outstanding hexagonal flange 34 of the plug 28.

The plug 28 has the threaded opening 35 to make connection to a hydraulic line as shown at 36 in FIG. 7.

The connection rod 23 will pass through and bear in the bore 37 at the right hand side of the cylinder K which is provided with a recess 38 receiving the seal 39.

The end plug 40 will compress said seal into position in the recess 38 and prevent leakage of hydraulic fluid.

The enlarged portion of the cylinder K at 20 is squared.

The angle plate 60 forming part of the adjustment N has a top portion 61 slotted at 62 to receive the clamping screw 63 which is threaded into the threaded socket 64 (see FIG. 1).

The top portion 61 will fit in a slot 65 between the shoulders 66 (see FIG. 2) and there will be a pin indicated at 67 which may project upwardly into one of the openings 68 to fix the position of the adjustment plate 60.

Figure 8:
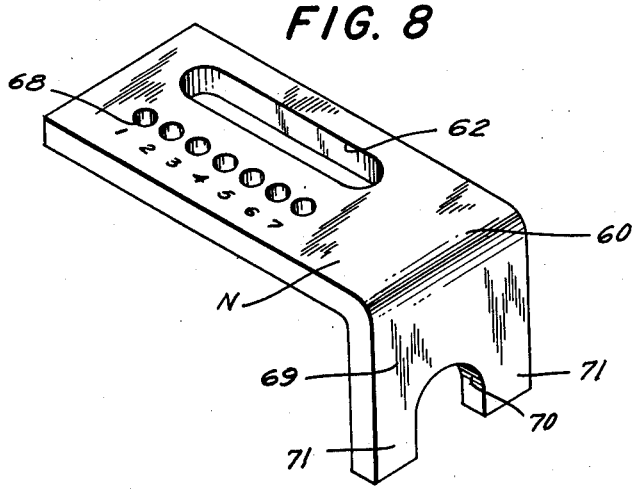
FIG. 8 is a top perspective view of the right annular adjustment unit, upon an enlarged scale as compared to FIGS. 1 and 2.

The front flange 69 (see FIGS. 1 and 8) has the opening 70 which forms a fork 71 against which the enlarged end 72 of the clevis member 73 will contact at the end of the return movement by the stressed spring 24 of the connecting rod 23 and piston L.

By pressing the pin 67 at different openings 1 to 7 it is possible to vary the stroke, for example, from by as much as 1″ to 1½″.

In the adjusted position shown in FIG. 1, the full maximum stroke is is shown.

The head or enlargement member 72 is held onto the right end of the rod 23 by means of the pin 74.

By varying the settings from 1 to 7 it is possible to vary the hydraulic strokes from 67.5 to 9.6 hydraulic strokes per lubricating cycle and to vary the discharge from 2.9 cc. of lubricant to 20.8 cc. of lubricant.

The piston L itself is provided with a small hole 75 (see FIG. 1) drilled therethrough, permitting bleeding of a small amount of oil and thereby cushioning the shock of operation at high pressures where the pressure range is in the upper part of the preferred range of 150 lbs. p.s.i. up to 3,000 lbs. p.s.i.

The gaskets 33 may be of the linear O type ring gaskets while the gaskets at 39 in the recess 38 in FIG. 1 may be of the green tweed palmetto packing type consisting of a synthetic T shaped plastic ring supported on both sides by phenolic resin rings which prevent the packing from being squeezed into the clearance around the piston rod.

The clevis 73 has the pivot pin connection 80 to the link 81 which in turn has a pivot pin connection 82 to the clevis 83 projecting from the actuating lever H of the main drive shaft E.

The lever H as shown in FIG. 5 has an opening 84 which as shown in FIG. 5 has the opening 84 to receive the pawl member 85 pressed upwardly by the spring 86 which is held in position by the threaded plug 87.

The stud pin 88 will act as a stop for the upward movement of the pawl. This pawl 85 will engage and drive the ratchet 89 which is fixed to the shaft E. This ratchet 89 is received in the tubular housing 90 the end of which housing in turn is closed by the plug 92 having the threaded portion 91 threaded at 93 into the housing 90.

The housing is held in position by the peened-out portions 94 on the tubular bearing structure 95 which extends inside of the bore 96 in the top enclosure structure 97, from the side of the housing 98 forming part of the enclosure D.

The housing 97 has the enlarged portions 99 to which is attached the plate 100 by the bolts 101. The plate will close the lubricant receiving chamber 102 and will hold the seals 103 and 103a in position.

The shaft E has the enlarged bearing portions 104 and 105 (see FIG. 4) with the intermediate recess portions 106 and 107 in which lubricant may be fed.

At the other end of the shaft E is provided the second ratchet 108, both of which ratchets are partly shown in FIG. 5 in end view and in top view in FIG. 4.

The ratchet 108 which is also fixed to the shaft E is provided with a fixed pawl 109 which may reciprocate in the bore 110 in the housing 98 and which is provided with a stop stud 111.

The spring 112 will press the pawl 109 to the left as shown in FIG. 5 and the pawl 109 and the spring 112 will be held in position by the projection 113 on the threaded plug 114 in the side 115 of the housing 98 (see also FIG. 3).

The through opening 116 will permit flow of any lubricant from the space 117 in FIG. 5 back to the reservoir A lubricating the reciprocating movement of the pawl.

The outside pawl 85 will also be lubricated by any lubricant which passes through the clearance provided by the reduced shaft diameter 106 (see FIGS. 4 and 5).

The end 130 of the shaft E as shown in FIG. 4 carries a sleeve 131 held in position thereon by the pin 132 which holds the spiral gear 133 against the collar 134.

This spiral gear 133 will mesh with and drive the spiral gear 135 held on the shaft 136 by a collar 137 and the pin 138 (see FIG. 4).

The bottom 139 of the housing 98 has a flow opening 140 (see FIG. 4) which will permit lubricant to flow into the recess 141 in the cover B from whence it may drip down through the drip pipe 142 over the internal gearing at W (see FIG. 3 also).

The cover 143 of the housing 98 will be clamped thereto by means of bolts extending into the tapped openings 144 (see FIGS. 3 to 5) with the gasket 146 forming a seal.

The shaft 136 as shown in FIG. 3 will extend through the upper leg 147 and have a bearing in the lower leg 148 of the U-shaped bracket 149 which is mounted upon the cover B at the leg 147 and carries the internal pump structure.

The vertical shaft 136 will carry the worm 150 by means of the pin 151 which worm will mesh and drive the gear wheel 152 on the shaft 153.

The shaft 153 will turn the cam U and it is provided with a lost motion connection by means of the stud 154 and the recess 155 in the cam plate member 156.

The shaft 153 is held in the body portion 157 by means of the stud 158 having the nut 159.

The cam will act upon the roller 160 held free to rotate by the pin 161 held between the two side plates 162 forming the lever T.

The lever T is pivotally mounted by the pin or bolt 163 upon the flatted portion 164 of the downwardly depending member 165.

As shown in FIG. 5, the other end of the pivot bolt 163 is held in position by the nut 166.

The downwardly depending member 165 (see FIGS. 3 and 5) has an upwardly projecting rod 167 which extends through the opening 168 and into the enlarged recess 169 where it receives the knurled wheel or annulus 170.

The knurled annulus 170 projects as indicated in FIGS. 3 and 5 so that it may be turned to lower or elevate the threaded member 167 and thus raise or lower the pivot point 163 of the cam rod T.

The screw 171 and washer 172 act as a stop to limit the downward movement of the pivot 163 by contacting the shoulder 173 at the bottom of the recess 174.

The plates 162 as shown in FIG. 3 have the enlarged semi-circular rounded portions 190 and 191 (see FIG. 3).

The rounded portions 190 will be acted upon by the cup 192 which is pressed down by the coil spring 193 the upper end 194 of which retracts the upper leg 147 of the U-shaped structural member 149.

It will be noted that this leg 147 is mounted on the cover by means of the bolts 195 (see FIG. 3) and 196 (see FIG. 5).

The lower rounded portion 190 will act upon the top portion 197 of the piston P which reciprocates in the bore 198 in the cylinder 199.

The lower portion of the cylinder 199 is closed by the threaded inlet check valve unit 200 which in turn is enclosed by the strainer Q.

The strainer Q has the inverted cup 201 with the strainer plates 202 and the filter 203 held in position by the split ring 204 (see FIG. 3).

The stroke of the piston P will be regulated by movement upwardly and downwardly of the position of the pivot bolt 163 by the knurled adjustment member 170.

The pump will discharge through the outlet connections 205 and 206 which are connected to the outlet tubing 207 and 208 forming part of the conduit systems Y and R respectively.

The conduit system R has a compression coupling connection at 209 to the outlet S which in turn is provided with a tubular conduit connection at 210 (see FIG. 7) to the outside system.

The tubing system Y leads to the restriction fitting Z which permits a certain amount of the lubricant to flow into the clearance provided by the reduced diameter portion 107 at 211 (see FIG. 4).

Referring to the instant feed button F, this instant feed button is connected to a rod 225 which carries two plates 226 and 227 separated by a sleeve 228.

When the knob F is pulled upwardly the plate 227 will strike the rounded end portions 191 of the plates 162, elevating the piston P and compressing the spring 193. The cam will be released by means of the lost motion connection 154 and 155 and the cam will swing around so that upon release of the member F the pump piston P under influence of the spring 193 may undergo a full stroke.

In operation the hydraulic piston L will be operated once for each application of hydraulic pressure from the mechanism and its stroke will be adjusted by its position of the depending flange 69.

Each stroke will oscillate the depending handle member or lever H causing the pawl 85 of FIG. 5 to advance the shaft E in counter-clockwise direction, as shown in FIG. 5 with the return movement being accomplished by the pawl 85 clicking over the teeth as it moves in clockwise direction.

The other ratchet 108 acted on by the pawl 109 will hold the shaft E still against retrograde motion as the lever H is reversed. This intermittent motion will slowly rotate the shaft 186 through the gearing V and then the cam U through the gearing W (see FIG. 3).

The lever T will gradually be elevated by the lobe 231 of the cam U acting on the roller 160 and stressing the spring 193.

At the drop 230 the piston P will be forced down under the influence of the spring 193 forcing the lubricant out through the connections R and Y respectively to lubricate the interior of the pump and the outside distributing system from the connection S.

The lubricant passes from the reservoir A through the strainer Q past the inlet check valve 200 on the upstroke of the piston P and then will be forced out through the outlet check valve 232 on the down-stroke of the pump.

Any excess lubricant to feed the upper bearings of the shaft E and the gearing V will be dripped back into the reservoir A by the drip pipe 142.

The pump as shown conveniently adapts itself to supply of lubricant to a mechanism having a hydraulic actuating device with the line pressure being available ranging from 150 to 3,000 lbs. p.s.i.

Figure 9:
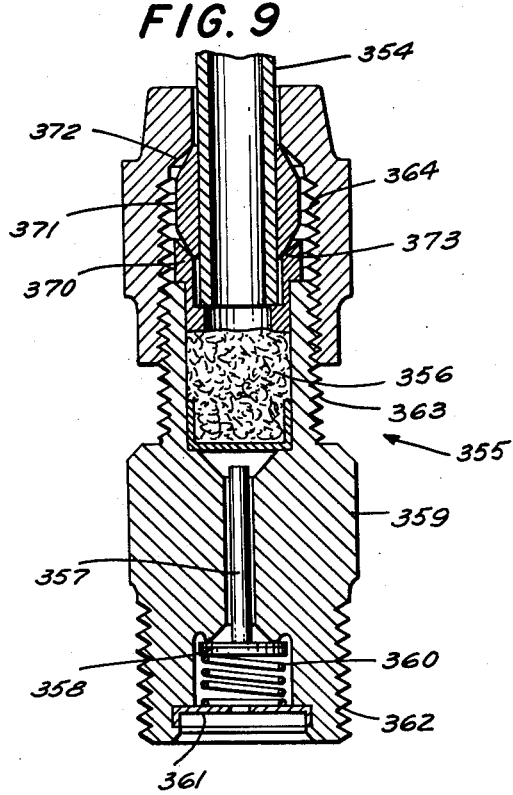
FIG. 9 is a longitudinal sectional view of a typical outlet metering fitting.

Referring to the small metering fitting, as shown in FIG. 9, there is indicated a fitting 355 with a body 359 having an inlet flow tube 354. This tube 354 may be supplied from the outlet of the pump, indicated at 210 in FIG. 7.

The inlet tube 354 projects into the sleeve 370 and is clamped in position between the double tapers 372 of the threaded coupling nut 364 and 373 of the insert 370, which clamp the ends of the double tapered coupling sleeve 371 in position.

The nut 364 is threaded onto the end 363 of the fitting 359.

The lubricant will pass through the inlet strainer 356 before it passes the restriction pin 357.

The valve 358 will be closed by the spring 360 when no flow is taking place.

The spring retainer 361 will be fitted into the threaded end 362 of the fitting 359. The threaded end 362 may be threaded through into a bearing opening.

While there has been herein described a preferred form of the invention, it should be understood that the same may be altered in details and in relative arrangement of parts within the scope of the appended claims.

Having now particularly described and ascertained the nature of the invention, and in what manner the same is to be performed, what is claimed is:

1. A hydraulically controlled central reciprocating spring returned piston pump for a centralized lubricating branched distributing piping system having a reduction gearing arrangement periodically to raise and release said piston against spring pressure and an adjustable stroke reciprocating hydraulic piston having a connecting rod, a lever, a drive linkage between said rod and lever, a shaft, a drive ratchet at one end of said shaft, said lever driving the ratchet, and a drive connection from the other end of said shaft to said gearing arrangement to actuate said gearing arrangement, said pump having a piston and a connecting rod and a return coil spring encircling said connecting rod to return said piston.

2. A hydraulically controlled central reciprocating spring returned piston pump for a centralized lubricating branched distributing piping system having a reduction gearing arrangement periodically to raise and release said piston against spring pressure and an adjustable stroke reciprocating hydraulic piston having a connecting rod, a lever, a drive linkage between said rod and lever, a shaft, a drive ratchet at one end of said shaft, said lever driving the ratchet, and a drive connection from the other end of said shaft to said gearing arrangement to actuate said gearing arrangement, said pump having a piston and a connecting rod and a return coil spring encircling said connecting rod to return said piston, said piston being mounted with its axis transverse to the axis of the piston pump and manually adjusting means to adjust the stroke of both pistons.

3. A hydraulically controlled central reciprocating spring returned piston pump for a centralized lubricating branched distributing piping system having a reduction gearing arrangement periodically to raise and release said piston against spring pressure and an adjustable stroke reciprocating hydraulic piston having a connecting rod, a lever, a drive linkage between said rod and lever, a shaft, a drive ratchet at one end of said shaft, said lever driving the ratchet, and a drive connection from the other end of said shaft to said gearing arrangement to actuate said gearing arrangement, said pump having a piston and a connecting rod and a return coil spring encircling said connecting rod to return said piston, said hydraulic piston being provided with an adjustable plate to limit its return stroke.

4. A hydraulically controlled central reciprocating spring returned piston pump for a centralized lubricating branched distributing piping system having a reduction gearing arrangement periodically to raise and release said piston against spring pressure and an adjustable stroke reciprocating hydraulic piston having a connecting rod, a lever, a drive linkage between said rod and lever, a shaft, a drive ratchet at one end of said shaft, said lever driving the ratchet, and a drive connection from the other end of said shaft to said gearing arrangement to actuate said gearing arrangement, said pump having a piston and a connecting rod and a return coil spring encircling said connecting rod to return said piston, both pistons being spring-loaded and manually adjustable means to vary the stroke of both pistons.

5. A hydraulically controlled central reciprocating spring returned piston pump for a centralized lubricating branched distributing piping system having a reduction gearing arrangement periodically to raise and release said piston against spring pressure and an adjustable stroke reciprocating hydraulic piston having a connecting rod, a lever, a drive linkage between said rod and lever, a shaft, a drive ratchet at one end of said shaft, said lever driving the ratchet, and a drive connection from the other end of said shaft to said gearing arrangement to actuate said gearing arrangement, said pump having a piston and a connecting rod and a return coil spring encircling said connecting rod to return said piston, said hydraulic piston being connected to said piston pump by a shaft the axis of which is transverse to the axes of both pistons and said reduction gearing including two spiral gears and a cam driven by said spiral gears and a lever actuated by said cam to elevate said piston of said piston pump against spring pressure.

References Cited in the file of this patent

UNITED STATES PATENTS

| | | |
|---|---|---|
| 1,099,449 | Kimball | June 9, 1914 |
| 1,315,527 | Sara | Sept. 9, 1919 |
| 2,016,400 | Tear | Oct. 8, 1935 |
| 2,431,534 | Benner | Nov. 25, 1947 |
| 2,596,360 | Blakeway | May 13, 1952 |